United States Patent [19]
Peschel et al.

[11] 3,860,198
[45] Jan. 14, 1975

[54] TAKE-UP DRIVE FOR CINEMATOGRAPHIC APPARATUS

[75] Inventors: Heinz Peschel, Stuttgart; Manfred Radtke, Korb, both of Germany

[73] Assignee: Eastman Kodak Company, Rochester, N.Y.

[22] Filed: Mar. 16, 1973

[21] Appl. No.: 342,006

[30] Foreign Application Priority Data
May 30, 1972 Germany.....................2226204

[52] U.S. Cl.................... 242/205, 226/62, 352/191
[51] Int. Cl............................................. G03b 1/06
[58] Field of Search........... 242/205, 206, 207, 208, 242/209, 210; 352/191, 192, 193, 194, 195, 196; 226/62, 63, 64, 65, 66, 67, 68

[56] References Cited
UNITED STATES PATENTS
3,166,264  1/1965  Denk................................. 242/208

3,706,427  12/1972  Theer................................. 352/191

FOREIGN PATENTS OR APPLICATIONS
1,359,242  3/1964  France............................. 352/191

*Primary Examiner*—George F. Mautz
*Attorney, Agent, or Firm*—J. Morrow

[57] ABSTRACT

In cinematographic apparatus, such as a motion picture camera, a leg spring operatively couples a film advancing mechanism and a film take-up mechanism of the camera such that when the camera drive mechanism drives the film advancing mechanism, the leg spring synchronously drives the take-up mechanism of the camera.

6 Claims, 1 Drawing Figure

PATENTED JAN 14 1975  3,860,198
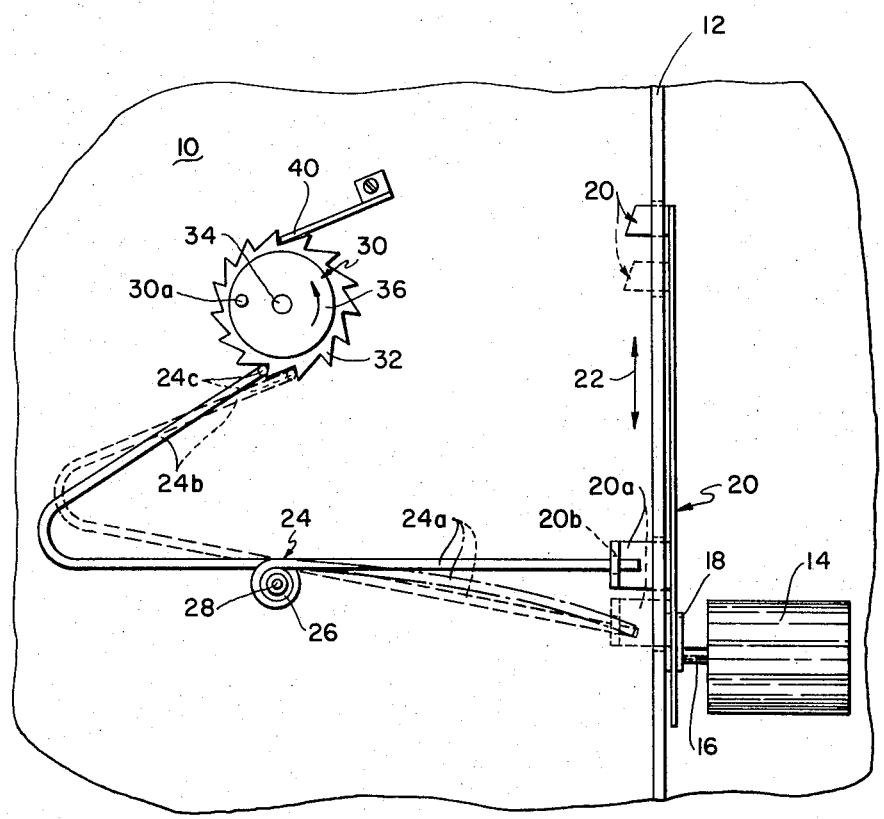

TAKE-UP DRIVE FOR CINEMATOGRAPHIC APPARATUS

CROSS-REFERENCE TO RELATED APPLICATIONS

Reference is made to commonly assigned copending United States Patent application Ser. No. 288,473 entitled, "FILM DRIVE FOR CINEMATOGRAPHIC APPARATUS" filed in the name of Gunter Sachs on Sept. 12, 1972.

BACKGROUND OF THE INVENTION

1. Field Of The Invention

The invention relates to a take-up drive mechanism for a cinematographic apparatus, such as a motion picture camera, and more particularly to a mechanism for winding a portion of a film strip into a roll or coil at the same time another portion of the film strip is being advanced through the cinematographic apparatus.

2. Description Of The Prior Art

It is known in the motion picture camera art to wind exposed film into a film coil in the take-up chamber of a camera or cartridge by using a variety of drive mechanisms. These mechanisms generally have complicated delicate gear portions dependent on the drive motor for driving the film reel. These have many individual parts, are inefficient and subject to friction and abrasion besides being extremely complicated in their mounting and adjustment. In order to avoid parts which are expensive or particularly disadvantageous with respect to energy, like worm drives as in German Pat. No. 1,244,569, for example, and friction parts whose operation is not always reliable when open to the influence of varying temperatures and humidity, constructions as in German Pat. No. 1,297,464 and the corresponding U.S. Pat. No. 3,570,783 have been devised. In the latter patents, two gears are alternatively driven in opposite directions of rotation in response to the reciprocating movement of the claw via two pawls which are mounted on one end of a lever controlled by the claw by means of a leg spring. These gears are connected to each other and also to the film take-up reel to cause the take-up reel to be driven by the gears in the take-up direction whenever the gears are driven by the pawls. Such a film reel drive mechanism also requires many parts to assemble and is therefore more expensive to manufacture than the present invention.

SUMMARY OF THE INVENTION

It is an object of the invention to further develop a take-up drive for a cinematographic apparatus which is inexpensive, resistant to wear, and easily manufactured and adjusted to operate quietly and reliably.

To achieve the desired objectives, a leg spring is pivotally supported by the apparatus and one end of the spring is coupled to the claw and the other serves as a shifting pawl of an indexing wheel associated with the film take-up reel. In this way, functioning of the film reel drive by the motor simply and reliably effects movement of the film take-up through the elasticity of the leg spring.

The invention and its objects and advantages will become more apparent in the detailed description of the preferred embodiment presented below.

BRIEF DESCRIPTION OF THE DRAWINGS

In the detailed description of the preferred embodiment of the invention presented below, reference is made to the accompanying drawing which the only FIGURE is a schematic representation of a preferred embodiment of the present invention.

DESCRIPTION OF THE PREFERRED EMBODIMENT

Because photographic apparatus are well known, the present description will be directed in particular to elements forming part of, or cooperating more directly with, the present invention, apparatus not specifically shown or described being understood to be selectable from those known in the art.

Referring now to the drawing, a portion of a movie camera of a known type is shown which includes a housing 10, a film path 12, a motor 14 having a drive shaft 16 secured to an eccentric 18, and a claw 20 which is reciprocally driven in the direction of arrow 22 by the eccentric 18. A film drive wheel 30 for a cartridge take-up or a take-up reel is rotatably mounted about a shaft 34 which is secured to the camera. Drive wheel 30, which also serves as an indexing wheel, includes a toothed rim portion 32 and an eccentric 30a which cooperates with a cartridge take-up (not shown) or a film take-up reel (not shown) to wind the film in a known manner.

In the preferred embodiment, a leg spring 24 serves as a positive connection between the claw 20 and the drive wheel 30 as shown in the drawing. The leg spring 24 is firmly connected to a sleeve 26 which is rotatable about a holding pin 28 secured to the housing 10. The sleeve 26 may be affixed to leg spring 24 by soldering or the like or as in the embodiment illustrated, may be wound tightly around the sleeve 26 so as to exert pressure thereon. If this is the case, the direction of winding of the spring 24 is selected to tend to pull tight when the operating power is transmitted from the motor 14 or the claw 20 to the drive wheel 30.

A lug 20a on the claw 20 has an insertion slot 20b for the driven end 24a of the leg spring 24 and the lug carries end 24a along on the strokes of the claw 20. The design of the other spring leg 24b is such that its end 24c, which is bent at right angles to the leg 24b, resiliently engages the teeth on rim 32 of the drive wheel 30 as shown in the drawing. In the preferred embodiment, leg 24b is geometrically shaped and positioned with respect to drive wheel 30 such that end 24c is moved substantially tangentially to the drive wheel 30. The resulting driving relation between end 24c and the teeth 32 on the drive wheel 30 is effective to result in more positive movement of the drive wheel 30 as will be described in greater detail.

When the film claw 20 is driven downward by the eccentric 18 from the solid-line position toward the hooked-line position, spring leg 24a is urged toward the position indicated in broken lines and the other spring leg 24b is urged to pivot into the position indicated in broken lines. The resulting movement of end 24c urges the drive wheel 30 in the counterclockwise direction as indicated by the arrow 36. A locking spring 40 cooperates with the toothed rim 32 to prevent the drive wheel 30 from turning backwards in a direction opposed to arrow 36. As the film claw 20 is returned to the upward position, both legs 24a and 24b of leg spring 24 are returned to the initial position shown in solid and the cycle can then be repeated indefinitely. However, on the down stroke of film claw 20 there may be increased forces resisting further rotation of drive wheel 30 as a result of the received film strip being wound tightly upon the reel. When the energy stored in spring 24 by the movement of leg 24a is not sufficient to overcome the forces resisting rotation of drive wheel 30, spring leg 24a can assume a variety of positions between that shown in solid and that shown in broken, as for example the position indicated in dash and dot lines. By assuming such a position, energy is stored in spring leg 24a during the downward stroke of film claw 20 and is released therefrom during the upward stroke of film claw 20.

The invention has been described in detail with particular reference to a preferred embodiment thereof, but it will be understood that variations and modifications can be effected within the spirit and scope of the invention.

We claim:

1. In a motion picture camera for receiving a film strip, the combination comprising:
    a. a winding mechanism for winding said film strip into a roll, said winding mechanism including a ratchet member;
    b. an advancing member for periodically engaging and advancing said film strip;
    c. a spring having a coiled portion supported by said camera and having two elongated legs, one of which cooperates with said advancing member in a reciprocating manner and the other of which cooperates directly with said ratchet member of said winding mechanism for advancing said ratchet member in a ratchet and pawl fashion.

2. A winding mechanism for a motion picture camera, said winding mechanism adapted to cooperate with a reciprocally driven film advancing portion of the camera to wind a received film strip into a roll as the film advancing portion advances the film strip through the camera, said winding mechanism comprising:
    a. a ratchet member rotatably supported by said motion picture camera, said ratchet member being adapted to be rotatably driven for winding the received film strip; and
    b. a spring member supported by said camera, said spring member having a first leg portion coupled to said film advancing portion of said camera such that the reciprocal movement of said film advancing portion imparts movement to said first leg portion in first and second directions and having a second leg portion directly engageable with said ratchet member for rotatably driving said ratchet member as said first leg portion is driven in said first direction by the film advancing portion.

3. The winding mechanism as set forth in claim 2 wherein said second leg portion of said spring member is bent at an acute angle with respect to itself.

4. Apparatus for winding a received film strip into a roll as the film strip is intermittently advanced by film advancing means, said apparatus comprising:
    a. winding means including a ratchet portion adapted to rotatably drive said winding means; and
    b. a spring member having first and second legs, said first leg coupled to said film advancing means and said second leg cooperating directly with said ratchet portion to rotatably drive said winding means as the film advancing means intermittently advances the film strip.

5. The apparatus as set forth in claim 4 wherein said second leg of said spring member is bent at an acute angle with respect to itself.

6. A winding mechanism for a motion picture camera, said winding mechanism being coupled to a reciprocally driven film advancing mechanism of the camera for winding a received film strip into a roll as the film advancing mechanism advances the film strip through the camera, said winding mechanism comprising:
    a. a ratchet member supported by said motion picture camera, said ratchet member being adapted to be rotatably driven for winding the film strip into a roll;
    b. a spring member having (1) a first leg portion operatively coupled to said film advancing portion of the camera and (2) a second leg portion cooperating directly with said ratchet member, said spring member being adapted to convert the energy supplied to said first leg portion by the reciprocal movement of said film advancing portion into a force for rotatably driving said ratchet member when said force exceeds the forces resisting the winding of said film.

* * * * *